(12) United States Patent
Fujii

(10) Patent No.: US 6,229,532 B1
(45) Date of Patent: May 8, 2001

(54) METHOD AND APPARATUS FOR BUILDING A UNIFORM RESOURCE LOCATOR MENU IN AN INTERNET TELEVISION SYSTEM

(75) Inventor: Toshiya Fujii, Menlo Park, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/096,138

(22) Filed: Jun. 11, 1998

(51) Int. Cl.[7] ................................................. G06F 3/00
(52) U.S. Cl. ........................ 345/327; 345/352; 345/357; 707/501; 707/513; 709/217; 709/219
(58) Field of Search ..................................... 345/327, 352, 345/353, 357, 329; 707/501, 513; 709/217, 219; 348/13, 10, 12

(56) References Cited

U.S. PATENT DOCUMENTS

| | | | |
|---|---|---|---|
| 5,774,664 | * 6/1998 | Hidary et al. | 709/218 |
| 5,790,793 | * 8/1998 | Higley | 709/218 |
| 5,818,935 | * 10/1998 | Maa | 380/20 |
| 5,907,322 | * 5/1999 | Kelly et al. | 345/327 |
| 5,918,237 | * 6/1999 | Montalbano | 707/513 |
| 5,929,849 | * 7/1999 | Kikinis | 345/327 |
| 5,977,969 | * 11/1999 | DiAngelo | 345/339 |

* cited by examiner

*Primary Examiner*—Raymond J. Bayerl
*Assistant Examiner*—Cuong T. Thai
(74) *Attorney, Agent, or Firm*—Gregory J. Koerner; Simon & Koerner LLP

(57) ABSTRACT

The present invention provides a method and apparatus for building a URL menu to access Internet web sites. The URL menu is stored in a set top box after accessing from a server. A URL is divided into a plurality of fields, e.g. three. Discrete fields are stored in databases within a server, and may be accessed and stored independently by the user into corresponding locations within the set top box. These three fields are individually and separately selected by the user with a plurality of buttons on a remote control. In another embodiment, URLs are obtained by keying on information in a broadcast vertical blanking interval, such as close-captioning data. A further embodiment involves generating URLs from a history of previously-accessed URLs. A final embodiment involves keying on information in a current document to select a word or term that may be utilized in a URL.

43 Claims, 10 Drawing Sheets

METHOD AND APPARATUS FOR BUILDING A UNIFORM RESOURCE LOCATOR MENU IN AN INTERNET TELEVISION SYSTEM

BACKGROUND OF THE INVENTION

1. Field of the Invention

This invention relates to a system for accessing the Internet, and particularly to a method and apparatus for building a Uniform Resource Locator (URL) menu in an Internet television system.

2. Discussion of the Background Art

Internet television systems are rapidly producing an alternative way of accessing the Internet. Television viewers, demanding entertainment and informational resources beyond cable broadcasting and video cassettes, are discovering that the Internet satisfies this need. Internet televisions systems offer technology that takes advantage of packet-switched information in the form of web pages available from wide-area networks in HTML or MPEG formats.

Internet television appeals to many consumers because it is less expensive and requires less technical sophistication than standard methods of accessing the Internet through a personal computer. Integration of Internet access resources with a television receiver also is more convenient than relying on a personal computer. Many potential users of the Internet who do not possess personal computers, or who are intimidated by the perceived technical skill involved in operating a personal computer, but who desire to use various Internet services (e.g., e-mail), are otherwise eliminated from this market. Moreover, from the standpoint of market suppliers, any increase in market share translates into further demand for innovative content and hardware devices. Commercial advertisers obtain another medium to impress their product on the public consciousness.

An Internet television system does not require complicated PC hardware and software such as a separate browser, a separate monitor, and a computer keyboard, to access the Internet. Typically, all of the accessing functions are performed within a set top box placed on top of the television. This set top box is connected directly to the television, and a remote control device typically controls the set top box with signals transmitting in the infrared or radio frequency bands. Memory within the set top box is typically less than required for a personal computer, and the operating system for the processor in the set top box is greatly simplified. The user does not have to purchase a separate video monitor, thereby reducing parts and consequent expense of the Internet access system.

One issue that arises is how to best control functions of a set top box to enter URLs. A URL is an address for accessing a site on a network or the Internet. While it is possible to utilize a keyboard, this increases the expense and complexity of the system because a protocol must be established for transmitting control information from a keyboard to an infrared sensor or radio receiver. Another possibility is to include a mouse, joystick, or track ball on a remote control to enter control information. The user manipulates the mouse or track ball over particular words, letters or icons on the television screen, and enters them with a button on the remote. However, it is difficult to accurately control a cursor position on a television display screen by indexing a mouse or track ball.

Thus, it is desirable to simplify access to the Internet using only a standard remote control device to select URLs, and to provide a simplified way of building URL menus in a set top box where great technical sophistication is not required.

SUMMARY OF THE INVENTION

The present invention provides a method and apparatus for building a menu of URLs (Uniform Resource Locators) to access Internet web sites. In the preferred embodiment, the URLs are stored in non-volatile memory of a set top box after accessing them from a remote server. A URL is divided into a plurality of fields, e.g. three. These fields are stored in separate databases within a server, and may be entered independently by the user into a separate URL menu selection within the set top box. The first field, called the "preamble," includes a general address designation such as "www". The last field, called the "postamble," includes a general address type such as ".com". The middle field contains a specific Internet site location such as ".Sony". Each of these three fields is individually accessed from the server and separately stored by the user with a plurality of buttons on a remote control. These buttons may include a URL button, a select button, and four arrow key buttons. After a plurality of each of the URL fields are stored in the set top box, they are displayed in a respective list box either in the set top box, or on the television screen. Once these discrete fields are stored into the set top box, they are herein referred to as "menu items." Selectable combinations of URL fields designated by the user then automatically access a desired web site.

A number of additional methods of obtaining URLs are further disclosed in addition to the technique of building user preferences, as discussed above. URLs may be obtained by keying on information in vertical blanking intervals of a television signal, such as close-captioning data, located between video frames. Another method involves keying on text fields in a current document to select a word or term that is then utilized as part of a URL for a web page. Finally, user input generates a history of previously accessed URLs. These embodiments also involve storing the captured URLs either in a non-volatile memory in the set top box or into databases on the server.

DETAILED DESCRIPTION OF THE PREFERRED EMBODIMENTS

One feature of the present invention concerns a method of building and inputting URLs. Conventionally, a URL is either typed into an address box above a web page on a personal computer, or a user points and clicks on a URL link (or iconic representation thereof). In most cases, therefore, an entire URL is selected to access a web page. Conceptionally, however, a URL has a number of component fields. A URL of the form "www.sony.com" may be divided into a first field, "www," a second field, ".sony," and a third field, ".com". Both the first field, "www" and the last field ".com" are common components of a URL. Alternatives to "www," e.g. "www1," "gopher," etc., and alternatives to ".com," e.g. ".org," ".ed," are also well known. Generally, a URL also includes fields following ".com," which may define a particular page within a web site, or any more specific location.

Figure 1A:
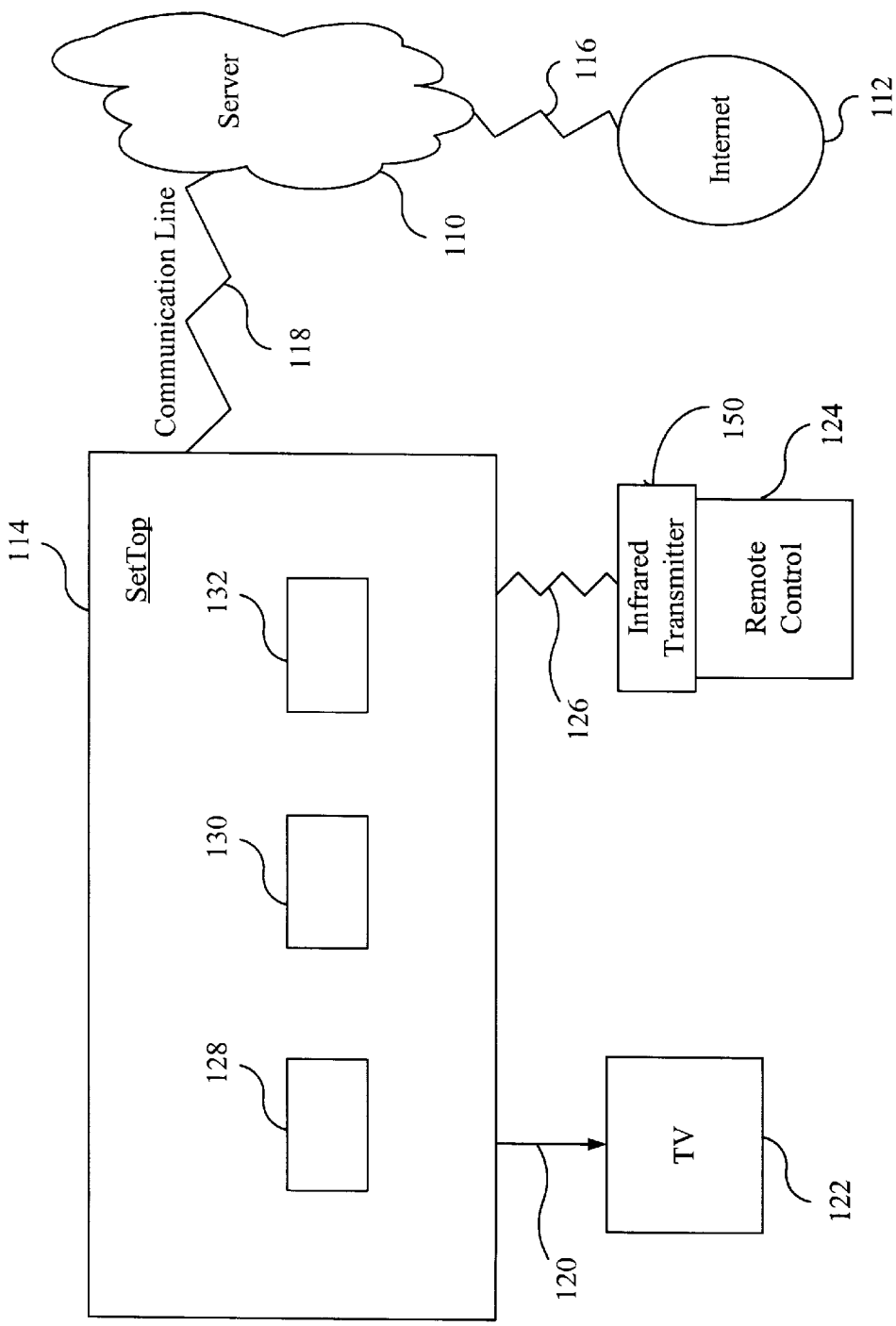
FIG. 1(a) shows a general system block diagram of main features of the present invention.

The present invention thus proposes a method of entering a URL as a series of component fields instead of typing the entire address as one field or clicking on a unitary link field. Preferably, the URL is divided into three fields, corresponding to the first, second, and third fields discussed herein. These three fields are selected with a remote control from list boxes showing menu selections that are stored in non-volatile memory of a set top box. However, fourth and fifth fields optionally may be included to input a more specific location within a web site. Furthermore, selection of a URL as a plurality of separable fields according to this invention is not limited to an Internet television device, but could include network computers (NC), handheld Internet-access systems, or other portable systems where elimination of a keyboard and/or mouse would be beneficial. FIG. 1(a) shows a general block diagram of the present invention including a set top box 114, television 122, remote control 124 having infrared transmitter 150, server 110 and Internet 112. Set top box 114 is connected to television 122 via line 120, and remote control 124 has an infrared transmitter 150 producing infrared beam 126 for controlling operation of set top box 114, television 122, and optional video cassette recorder (not shown). Set top box 114 is connected to server 110 via communication line 118. Server 110 provides access for set top box 114 to Internet 112 via communication line 116. Television 122 and/or set top box 114 contain displays for showing URL menu selections 128, 130, 132.

Figure 1B:
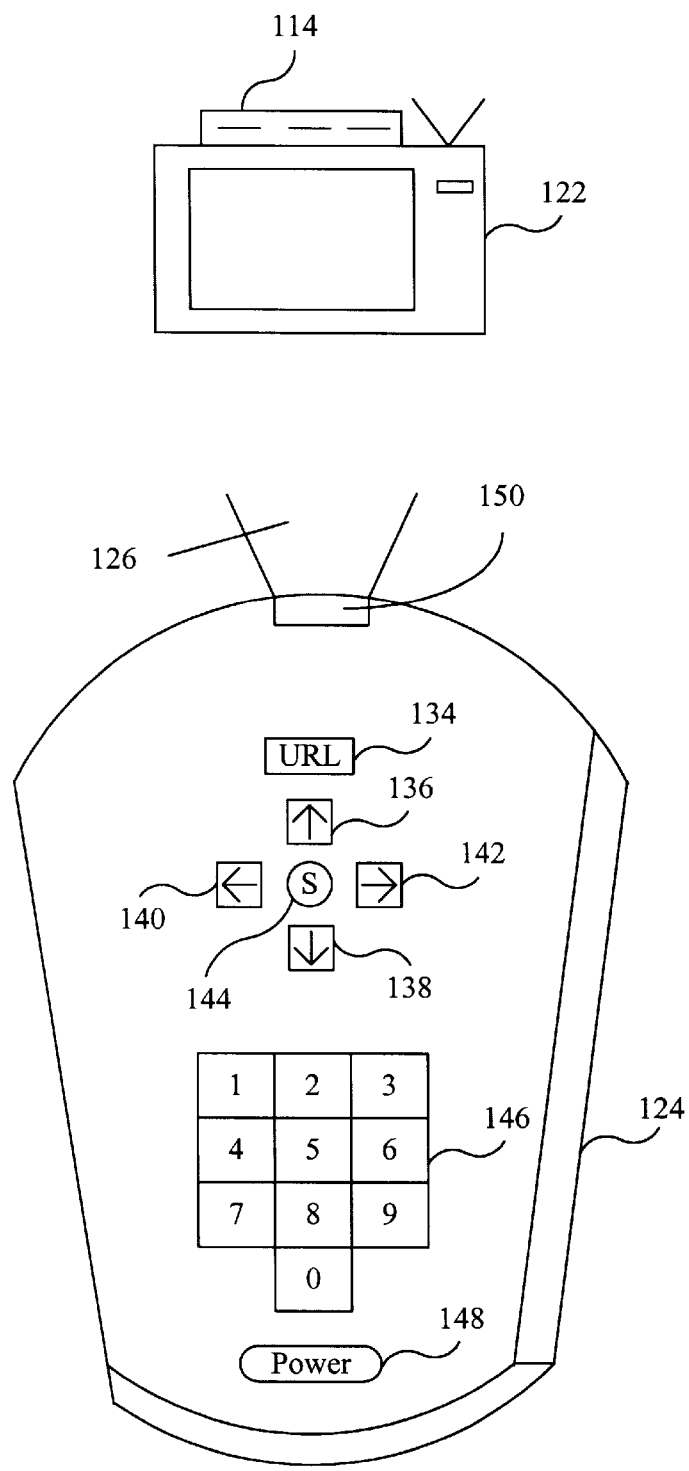
FIG. 1(b) illustrates a remote control having buttons adapted for controlling a set top box.

FIG. 1(b) illustrates one embodiment of remote control 124 having buttons including URL button 134, arrow keys 136, 138, 140, 142, select button 144, numerical keypad 146, and power button 148. Remote control 124 additionally has other remote control buttons (not shown) for controlling operation of television 122, an optional video cassette recorder and optional cable television connection. URL button 134 activates URL menu building features on television 122 through set top box 114. URL menus are displayed either on the cathode ray tube of television 122, or on a display mounted to set top box 114. Displays on set top box 114 may include liquid crystal displays, light emitting diodes, flat panels displays, or any other conventional display device.

In the preferred method, once a URL menu-building function is activated with URL button 134, URL fields are accessed from server 110, and displayed on the screen of television 122 or a on display of set top box 114. A user thereupon may store additional menu items from server 110 by individual selection with select button 144. Once a URL field is placed in set top box 114, these URL fields are referred to as menu items. Fields of URLs stored from server 110 are displayed as URL menu selections 128, 130, 132, and a user then chooses a desired URL field by moving between selections with up arrow key 136, down arrow key 138, left arrow key 140, and right arrow key 142. When a user finds a desired field of a URL, select button 144 is pressed, and that field of a URL is stored in a non-volatile memory of set top box 114.

Figure 2:
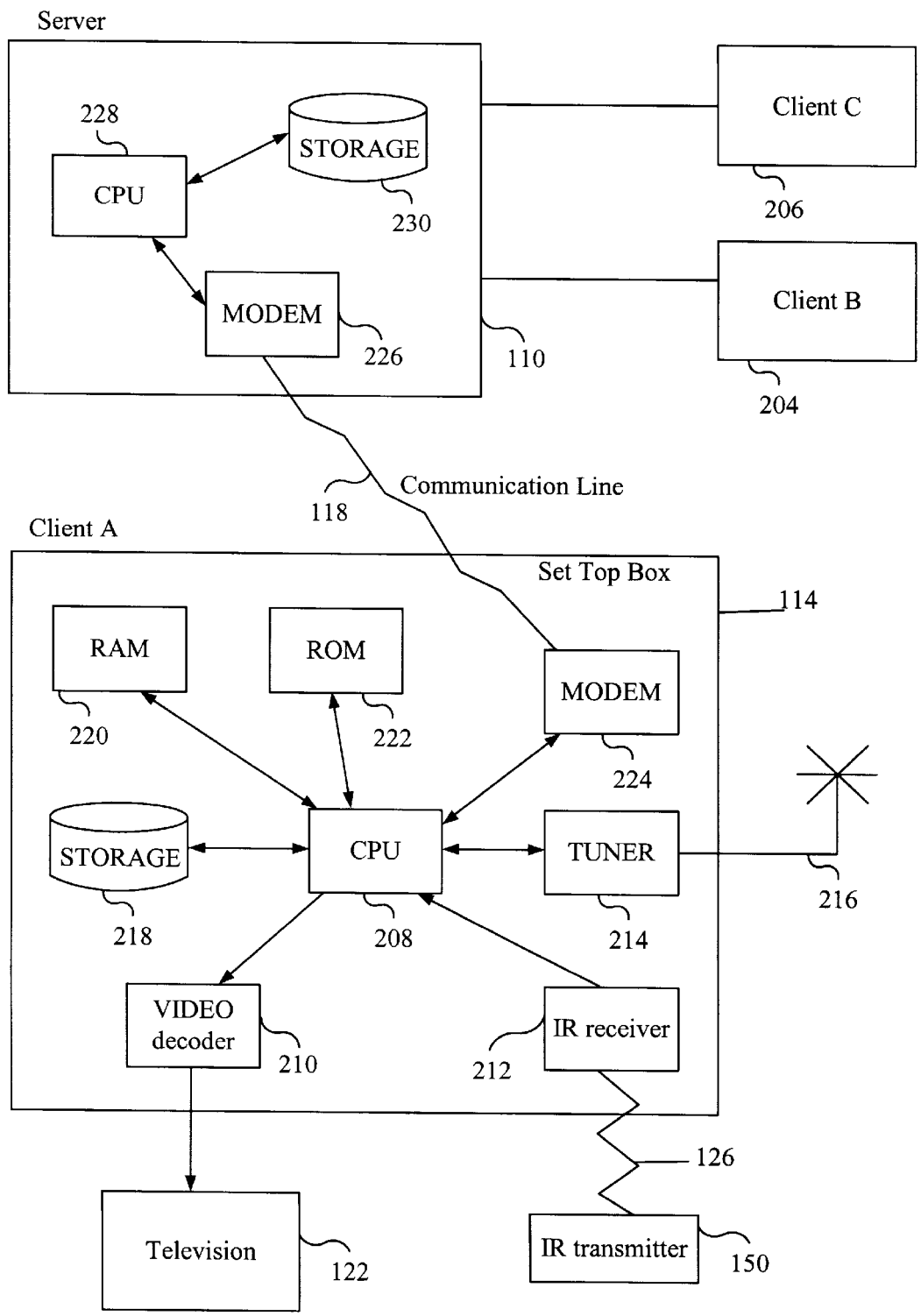
FIG. 2 shows a block diagram of a hardware system according to the present invention.

FIG. 2 shows a block diagram of a hardware system for a client/server architecture connecting set top box 114 (Client A), set top box 204 (Client B), set top box 206 (Client C), and server 110, according to the present invention. Only the components for Client A are shown, but there are similar components for Client B 204 and Client C 206. In addition to television 122 and infrared transmitter 150, the FIG. 2 embodiment comprises a set top box 114 having central processing unit (CPU) 208, video decoder 210, infrared receiver 212, tuner 214, non-volatile storage 218, random-access memory (RAM) 220, read-only memory (ROM) 222, and modem 224. Tuner 214 of set top box 114 is connected to antenna 216 for receiving television broadcast signals, and optionally to a cable television hookup (not shown). Modem 224 of set top box 114 connects to modem 226 of server 110 via communication line 118. Server 110 includes central processing unit (CPU) 228 and storage memory 230.

Storage memory 230 in server 110 preferably includes several databases each containing a plurality of URL fields. When a user presses URL button 134 on remote control 124, URL fields from storage memory 230 on server 110 are retrieved by server processor 228 and provided through server modem 226 via communication line 118 to client modem 224. Client CPU 208 takes these URL fields from client modem 224 and places them in random-access memory 220. Client CPU 208 may also send these URL fields through video decoder 210 to display them on the screen of television 122 or on set top box 114.

In the preferred embodiment, client A uses arrow keys 136 through 140 on remote control 124 to find a URL field that is desired to be stored in set top box 114. Client A selects this field entry by pressing select button 144 on remote control 124, whereupon infrared signal 126 is sent to infrared receiver 212. Client CPU 208 then moves the desired URL field from random-access memory 220 into non-volatile storage 218.

Program information within ROM 222 includes a simplified operating system and other software modules that tell CPU 208 how to perform tasks associated with building URL menus. An address module instructs CPU 208 how to select, store, and combine discrete fields of the URLs from server 110 into set top box 114. A capture module contains program information to obtain information for the discrete fields from a vertical blanking interval, a history of user inputs and text on a document page, to be described below.

Figure 3A:
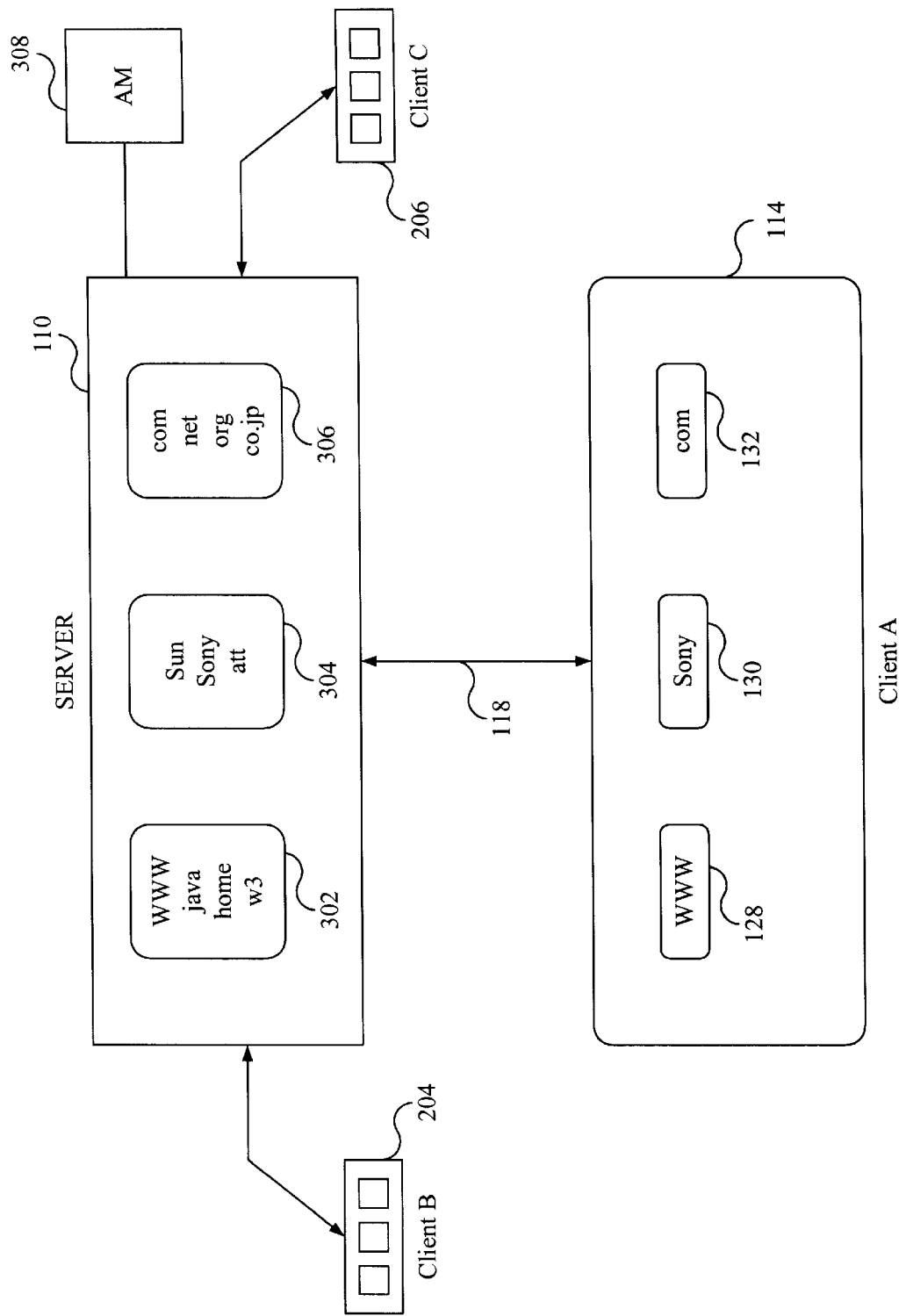
FIG. 3(a) illustrates a client/server architecture for accessing URLs in a plurality of fields.

FIG. 3(a) illustrates operation of a client/server architecture in accessing URL fields in accordance with the present invention. Server 110 preferably contains a plurality of database locations 302, 304, 306 containing respective URL fields. Databases 302, 304, 306 are portions of server storage 230. Preferably, the number of databases in server 110 is three, corresponding to three different URL fields, but any number of databases are generally contemplated by the present invention. ("Databases 302, 304, 306" in this context are either physically distinct memory hardwares or groups of memory locations within a unitary physical hardware structure.) Each of databases 302, 304, 306 divides a URL into respective corresponding fields. Preferably, the first field of a URL is called a "preamble," and the last field of a URL is called a "postamble."

The preambles of URLs are preferably stored in database 302. The most common URL preamble is "www," but those of ordinary skill in the art will recognize that other URL preambles such as "java," "home," "w3," "ftp," "www1," "gopher," etc., are also well known. Similarly, the postambles of URLs are stored in database 306. Common URL postambles include "com," "net," "org," "gov," "co.jp," but those of ordinary skill in the art recognize that other URL postambles are currently proposed.

The middle field of a URL is commonly subject to the most variation, but the names of companies, organizations, agencies, or abbreviations are often used. In one embodiment, an account manager 308 controls access to the collection of preambles, postambles, and middle fields of URLs stored in server storage 230, and makes these updates available to clients, such as Clients A, B and C of FIG. 3(a). Account manager 308 may update recommended URL fields that a service provider deems most valuable to a client, since searching for and finding these sites otherwise might adversely consume excessive client time.

Figure 3B:
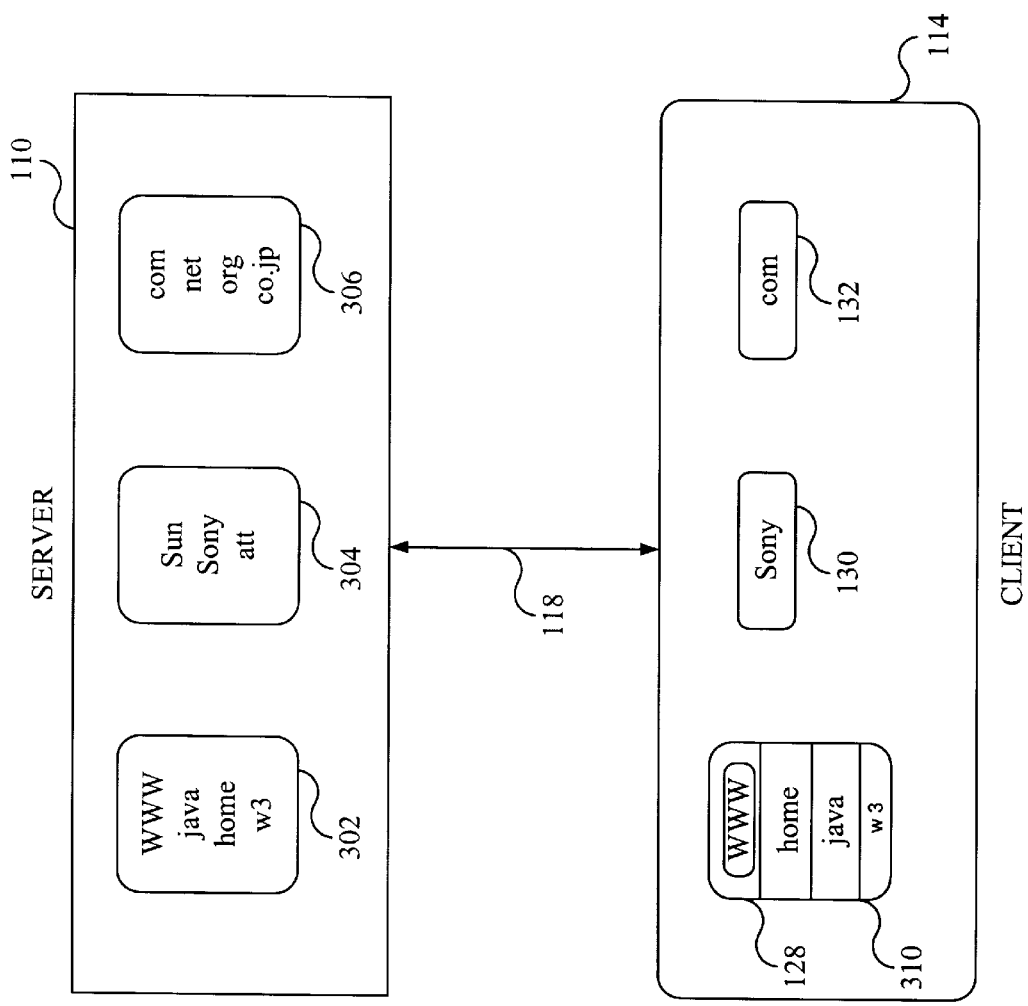
FIG. 3(b) illustrates selection of a first field of a URL.

FIG. 3(b) illustrates one embodiment for a client moving preamble fields of URLs from server 110 to set top box 114 for menu selection 128. Assume initially that set top box 114 contains only URL "www.sony.com" shown in FIG. 3(a). Storage memory 230 of server 110 further contains preambles "www," "java," "home," and "w3". In one embodiment, after pressing URL button 134 to activate the menu building process, the user presses left arrow key 140 on remote control 124 to access the set of menu items from server 110 that correspond to the first field of the URL. A list box menu 310 then appears on the screen of television 122, or in a display on set top box 114, containing the complete set of selectable menu items for the first fields from server 110, i.e. preambles "www," "java," "home," and "w3". The user then pushes up arrow key 136 and down arrow key 138 to move within the display of list box menu 310. Upon finding a URL preamble that the user desires to add to his non-volatile storage 218, the user then presses select button 144 on remote control 124, and that URL preamble moves from random-access memory 220 to a designated location in non-volatile storage 218 of set top box 114. Optionally, a current cursor position on the URL preambles is indicated by highlighting or reverse video on list box menu 310, and/or a user simultaneously selects a group of URL preambles for storage from the displayed list box menu 310.

Figure 3C:
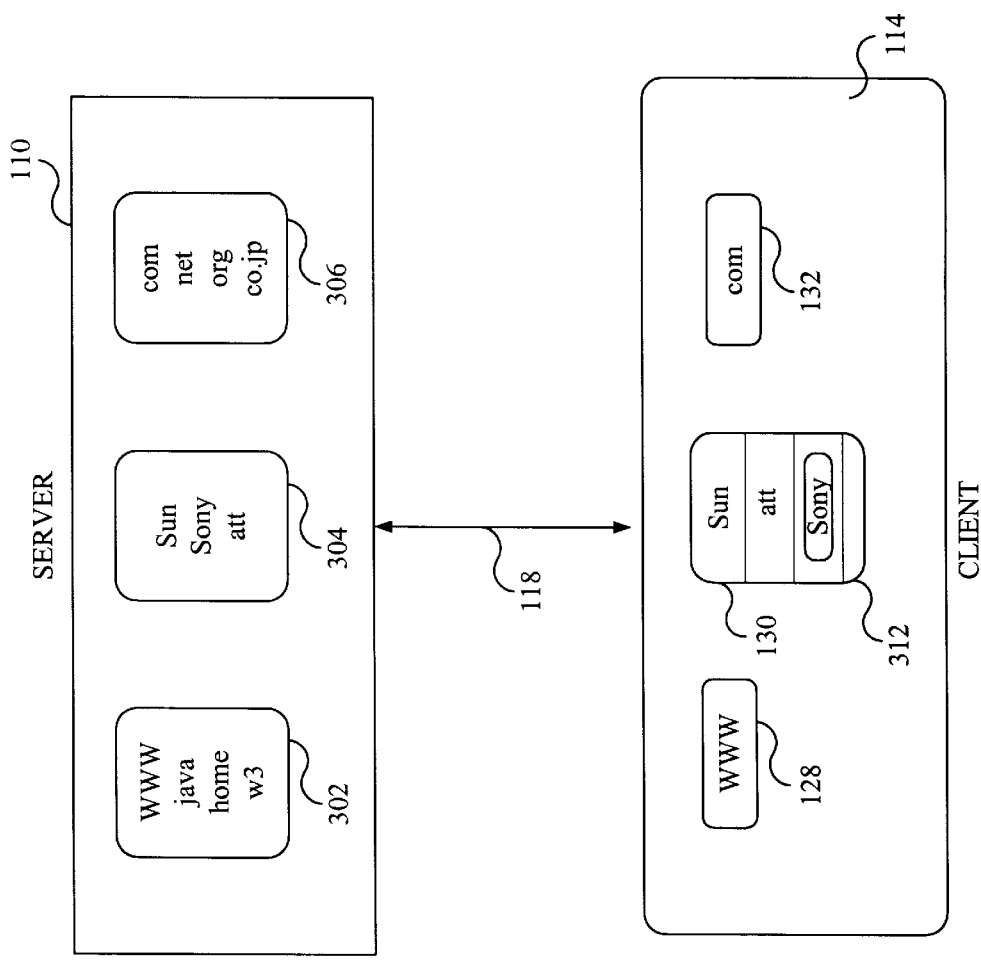
FIG. 3(c) illustrates selection of a second field of a URL.

FIG. 3(c) illustrates one embodiment for moving a middle field of a URL from server 110 to set top box 114 for menu selection 130. After menu selection 128 is completed, the user presses right arrow key 142 to move to menu selection 130. The complete set of URL middle fields obtained from storage memory 230 of server 110 are accessed and stored in random-access memory 220 of set top box 114. This set of middle fields from server 110 are displayed as list box menu 312 on the screen of television 122 or on a display of set top box 114. In FIG. 3(c), middle fields include company names as "sun," "att," and "sony." A user presses up arrow key 136 and down arrow key 138 to find a desired URL middle field in list box menu 312, and adds this selected URL field to a designated location in non-volatile storage 218 by pressing select button 144 on remote control 124. Optionally, a current URL preamble cursor position is indicated by highlighting or reverse video on list box menu 312, and/or a user simultaneously selects a group of URL preambles for storage.

Figure 3D:
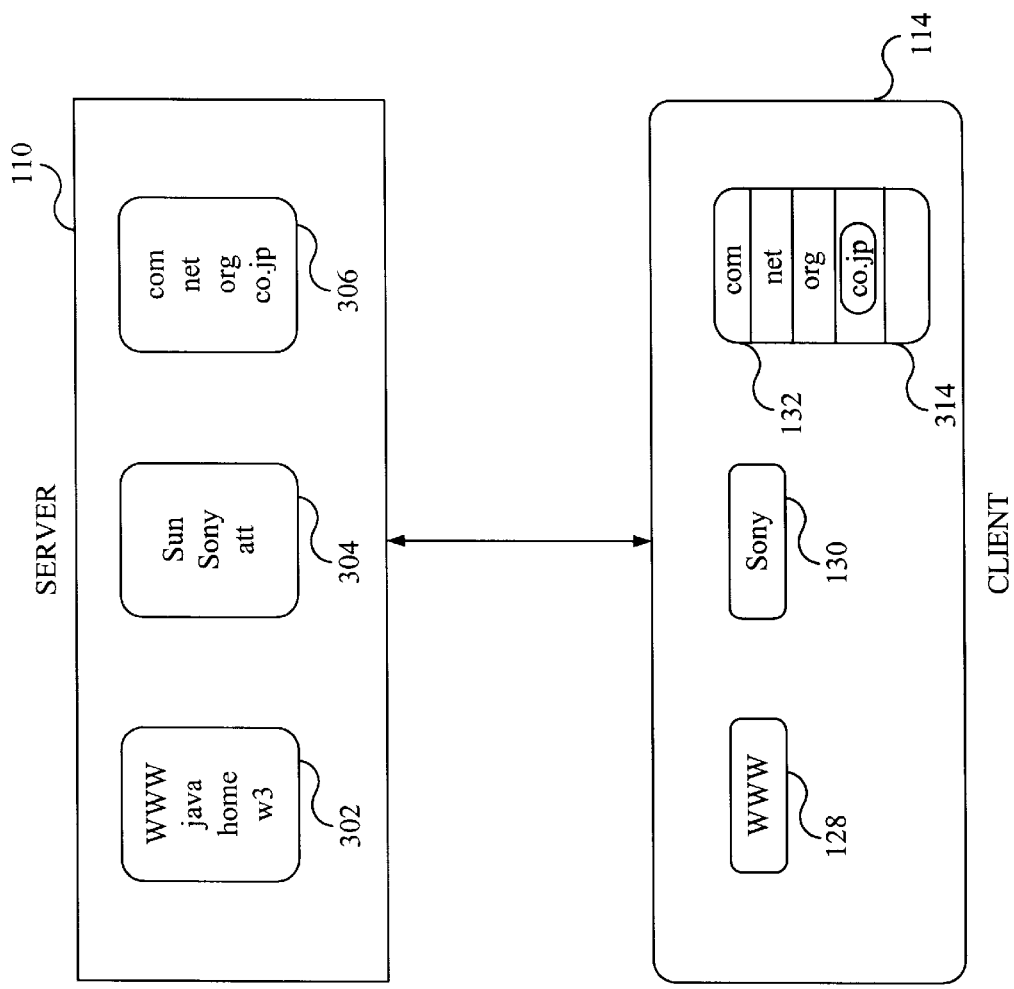
FIG. 3(d) illustrates selection of a third field of a URL.

FIG. 3(d) illustrates one embodiment for moving a postamble field of a URL from server 110 to set top box 114 for menu selection 132. After menu selection 130 is complete, the user presses right arrow key 142 to move to menu selection 132. The complete set of URL postamble fields obtained from storage memory 230 of server 110 is stored in random-access memory 220 of set top box 114, and this set of postamble fields from server 110 are displayed in list box menu 314 on the screen of television 122 or on a display of set top box 114. In FIG. 3(d), postamble fields are common URL suffixes "com," "net," "org," and "co.jp." The user presses up arrow key 136 and down arrow key 138 to find a desired postamble field of a URL, and adds the selected postamble field to a designated location in non-volatile storage 218 by pressing select button 144 on remote control 124. Optionally, a current URL preamble cursor position is indicated by highlighting or reverse video on list box menu 314, and/or a client simultaneously selects a group of URL preambles for storage.

FIGS. 3(b) to 3(d) further illustrate one embodiment for the selection of a URL from non-volatile storage 218 of set top box 114 to access to a web page 318 via the Internet 112. Once the user has completed building menu selections 128, 130 and 132 within set top box 114 by accessing server 110, URL button 134 is pressed again to terminate the process. The user then selects a particular combination of URL fields to access a desired web page. The combination of URL fields is obtained from menu selections 128, 130, 132 stored in individual corresponding locations of non-volatile storage memory 218 within set top box 114. The user presses left arrow key 140, whereupon the complete set of menu selections 128 stored in set top box 114 is displayed in list box menu 310 on the screen of television 122 or on a display in the set top box 114 (see FIG. 3(b)). Up arrow key 136 and down arrow key 138 are employed to scroll through list box menu 310. When a user finds a desired menu selection 128 corresponding to the preamble of the URL, the user presses select button 144. List box 310 then disappears from the display on the screen of television 122 or on the display of set top box 114, and only the desired preamble appears as menu selection 128.

This process is repeated for menu selections 130 and 132. For example, the user presses the right arrow key 142 to move from menu selection 128 to menu selection 130. The complete set of menu selections 130 from an individual location in non-volatile storage memory 218 of set top box 114 is displayed as list box menu 312 on the screen of television 122 or on a display in set top box 114 (see FIG. 3(c)). Up arrow key 136 and down arrow key 138 are employed to scroll through list box 312 until a desired middle field of the URL is found. The user then presses select button 144 on remote control 124, whereupon list box 312 disappears, and only the selected middle field appears as menu selection 130 on the screen of television 122 or on a display of set top box 114.

Figure 3E:
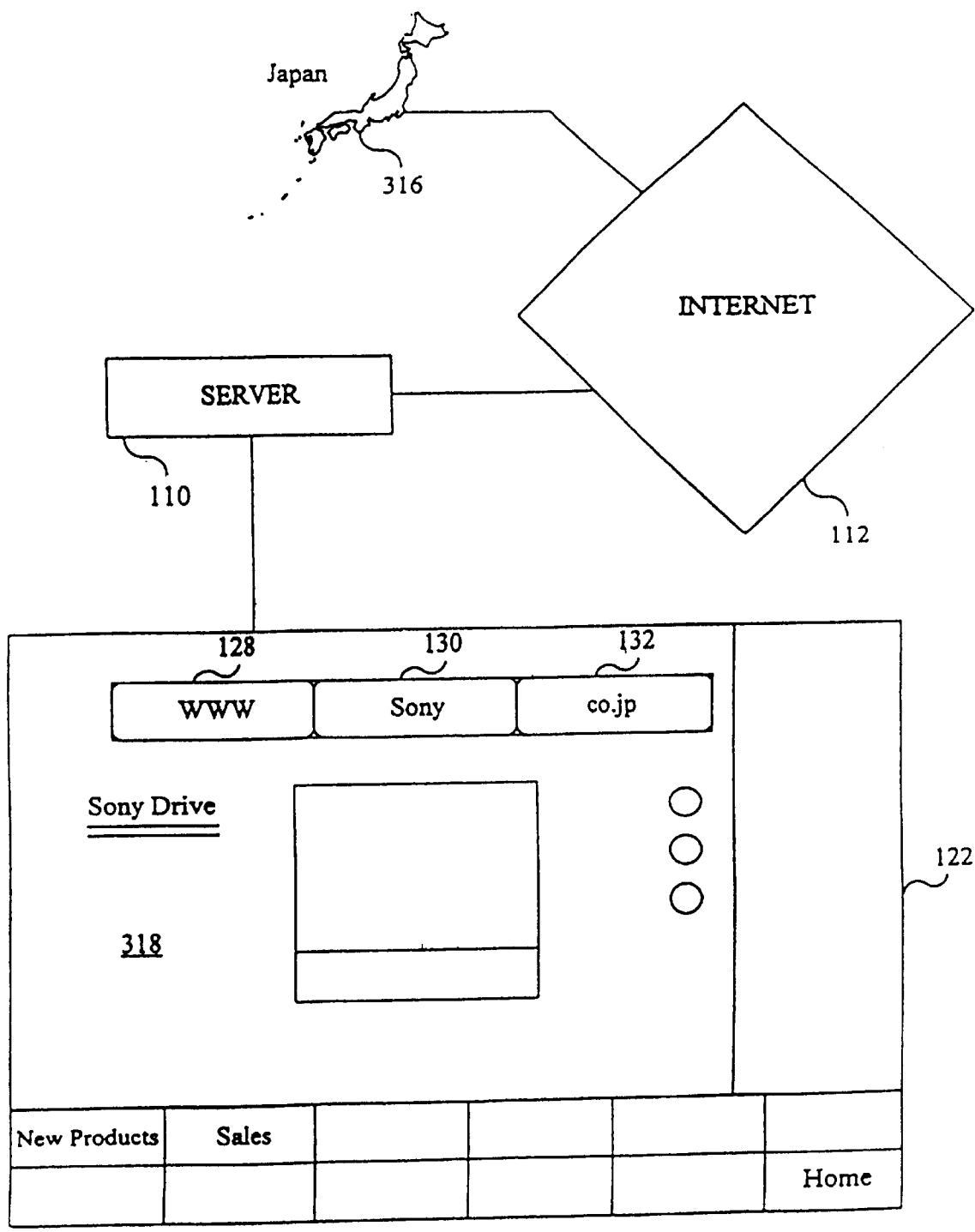
FIG. 3(e) illustrates access of a web page through selection of a URL.

FIG. 3(e) shows a web page 318 accessed with a selected URL. After menu selection 132 for the postamble field is compete, the entire URL is displayed on screen of television 122 or on the display of set top box 114 as "www.sony.co.jp" for menu selections 128, 130, 132. In the preferred embodiment, a user accesses this URL by again pressing select button 144 on remote control 124 to obtain web page 318. CPU 208 then retrieves program instructions from read-only memory 222 in set top box 114 telling client CPU 208 how to access Internet 112 with the selected URL. A request for access to this URL is transmitted by a service provider across server 110 to Internet 112. The system of routers on the Internet determines the best path to the destination address in Japan 316, and a web page 318 responsively travels back across Internet 112 to server 110. Server modem 226 then sends web page 318 to client modem 224, and client CPU 208 uses instructions from read-only memory 222 to display web page 318 on the screen of television 122 through video decoder 210. Thus, web page 318 is displayed on television 122 along with URL menu selections 128, 130, 132.

The preceding method of building a menu of URLs is called the "user-preferences" method. One major advantage of the user preferences method is that a client need not be sophisticated in knowledge of URL formats. An unsophisticated user thus sets the preambles and postambles for the URL on his/her set top box 114 to common "www" and "com" menu items. The user preferably does not have to insert periods or "dots" between the individual fields of the URL. This approach involves sufficient simplification that children may be taught to access the Internet at an early age. A second advantage is that the entry of the URLs is simplified. A user is not required to type out an entire URL each time he/she wishes to access an Internet web page. As Internet access becomes more universal, it is beneficial that web addressing schemes evolve towards such further simplification. A third advantage is reduction in process instruction and storage requirements. By including only a field of a URL instead of an entire URL, and by utilizing these fields in combinations, requirements for memory and processing instructions in a set top box are reduced. An entire URL need not be stored in memory since there is substantial duplication in common URL fields. Not only are there common URL fields in preambles and postambles, but a middle field of a URL is often used both in a commercial (.com) and an international company site (e.g., co.jp, co.au, etc.), or common terms are used as both commercial (.com) and organizations (.org).

The present invention provides four embodiments for building URL menus in set top box 114. These following four embodiments relate particularly to storing a middle field of a URL, but are optionally employed for selecting preamble and postamble fields.

(1) User Preferences: Client accesses individual fields of URLs from server 110, and selects specific fields of URLs to store in storage memory 218 of set top box 114;

(2) Broadcast Vertical Blanking Interval (VBI): Client captures information located in the vertical blanking interval of the television signal, and stores that information as a field of a URL in non-volatile storage 218 of set top box 114;

(3) User Input: Client history information about fields of URLs previously chosen is captured and stored in memory of set top box 114 or server 110; and (4) Current Document: Information used for fields of URLs is captured from a current document or web page during active connection to the Internet.

Generally, each of these four embodiments described above are utilized in combination, in order to provide a user with a plurality of methods to build a URL menu. The first embodiment employing user preferences is discussed above in conjunction with FIGS. 3(a) to 3(e).

Figure 4:
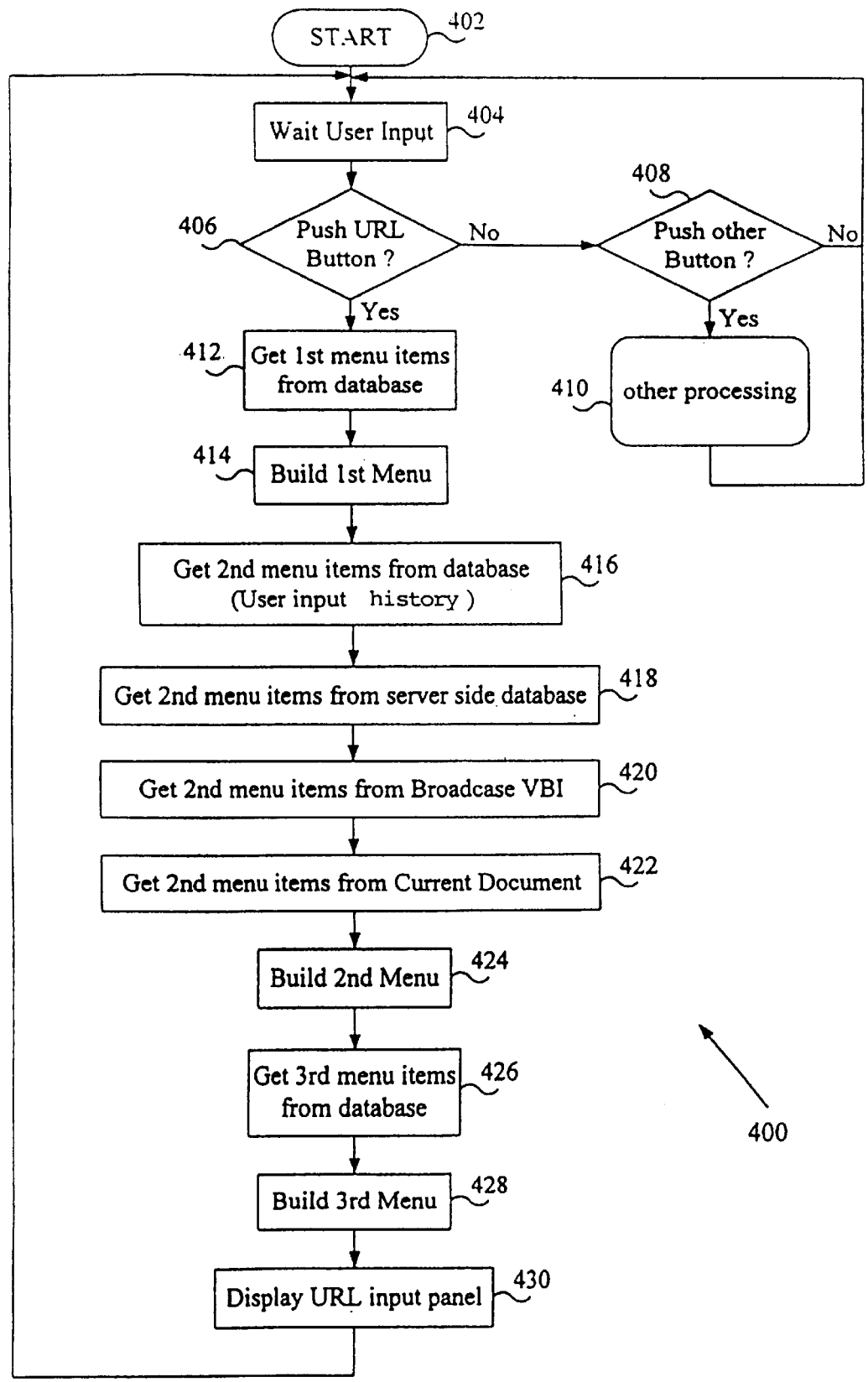
FIG. 4 shows a flowchart of preferred method steps for building a menu of URLs.

FIG. 4 is a flowchart of preferred method steps for building a URL menu according to the present invention. Initially, a system user starts by turning on set top box 114, television 122, and optional video cassette recorder (step 402), and set top box 114 thereupon awaits user input (step 404). When a user pushes URL button 134 on remote control 124 (step 406), a process of building menus by adding URLs begins with step 412; otherwise, set top box 114 determines whether the system user has pushed some other button (step 408), so as to cause another action (step 410), e.g. playing a video tape in a VCR.

The menu building process of FIG. 4 continues with set top box 114 obtaining first menu items from database 302 of server 110, and storing these first menu items in random-access memory 220 (step 412). These first menu items preferably correspond to the first fields, or preambles, of URLs. The user then selects one or more of these preambles to build first menu selections 128 in non-volatile storage memory 218 (step 414).

Set top box 114 then obtains second menu items corresponding to middle fields of a URL, by any of the four previously-described embodiments of the present invention. For example, a user preferably obtains these second menu items from a database of set top box 114 or server 110 indicating a history of user inputs (step 416), and/or a user obtains these second menu items from a server side database 230 by selecting user preferences (step 418), and/or a user obtains second menu items from information in a vertical blanking interval (VBI) (step 420), and/or a user obtains second menu items via information in text strings of a current document or web page 318 (step 422). The user thereupon selects any of these second menu items with select button 144 on remote control 124 to store as second menu selections 130 in non-volatile storage memory 218 of set top box 114 (step 424).

The user then obtains third menu items containing URL postambles, from storage 230 of server 110 and places the third menu item in random-access memory 220 of set top box 114 (step 426). One or more of the third menu items selected by the user with select button 144 on remote control 124 are entered into non-volatile storage memory 218 of set top box 114 to build third menu item selections 132 (step 428). Finally, the user displays the selected URLs in menu selections 128, 130, 132 (from non-volatile storage 218 in set top box 114) on a screen of television 122 or on a display of set top box 114 (step 430). The FIG. 4 process then returns to step 404 to await further user input.

Figure 5:
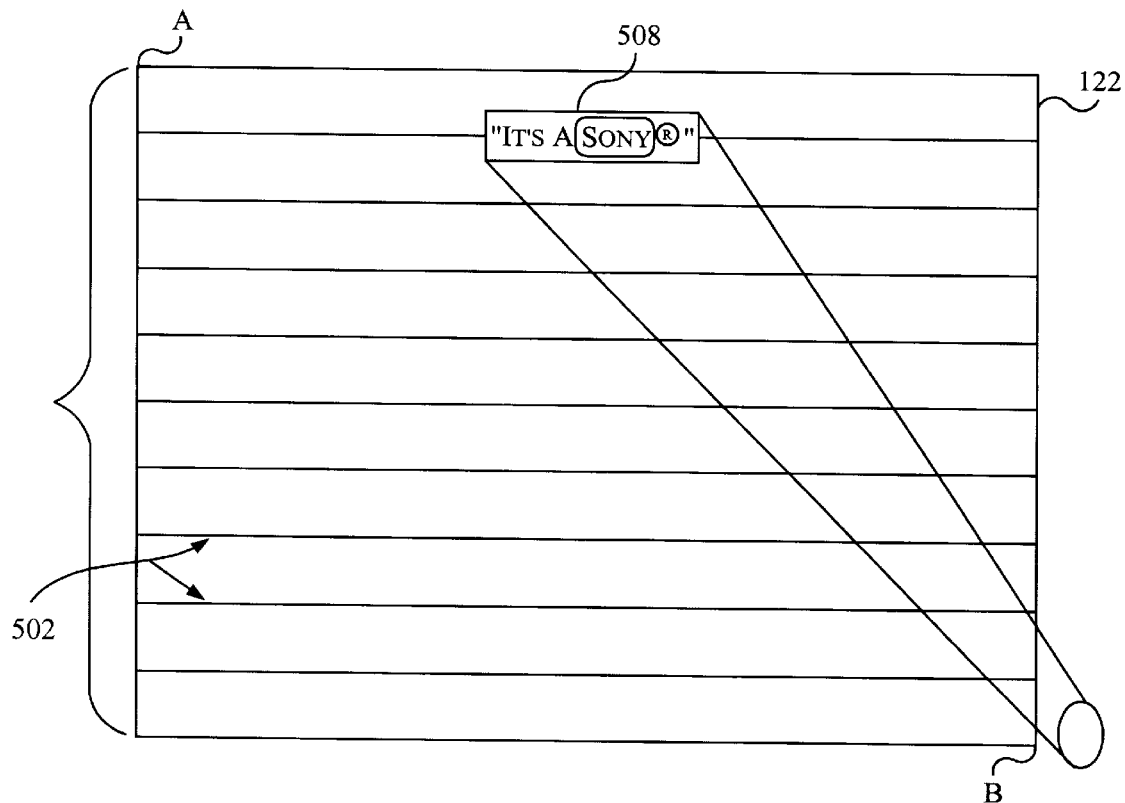
FIG. 5 illustrates capture of information from vertical blanking intervals for building a URL.

FIG. 5 illustrates building a URL from information found in a vertical blanking interval (VBI) of a video transmission signal, according to the present invention. Radio frequency video information is commonly transmitted by television broadcasters, and is preferably received by a tuner 214 (FIG. 2) located in set top box 114, processed by CPU 208, and sent to television 122 via video decoder 210. Television pictures are typically produced by hundreds of horizontal scan lines 502 created by electron beams projected from an electron gun onto the screen of a cathode ray tube. In the NTSC format, a new frame of video information is scanned every 1/30th second. A horizontal blanking interval is found at the end of each scan line 502, and a vertical blanking interval is located at the end of each complete vertical scanning period. Broadcasters often include information for purposes of close-captioning within the vertical blanking interval. (The present invention anticipates that some broadcasters alternatively may include other information related to web television in the vertical blanking interval.) Close-captioned television programs are often sponsored by a corporation or agency, as indicated by short advertisements in these captions, e.g. "Close-Captioning Sponsored by Sony. It's a Sony®!"

In the embodiment that utilizes the vertical blanking interval, a system user captures information from a close-captioned or other text field contained in a VBI, and this information is used as a field of a URL. In one embodiment, client CPU 208 scans the VBI for text strings with video decoder 210, and text strings are parsed into fields for display on the screen of television 122. A user presses arrow keys 136 to 142 of remote control 124 to position a cursor on display screen of television 122 by moving between parsed text fields. The current field position optionally is indicated by highlighting or reverse video of current displayed text. When a desired text field is found, the user presses select button 144 on remote control 124, and this selected text field is stored as a second menu selection item 130 in non-volatile memory 218.

There are numerous advantages to capturing information for a URL from a VBI method. Accessing a diversity of information sources clearly increases the flexibility of URL menu building. A user that builds a URL by the VBI method need not rely upon a service provider for choices. It may be easier to access a URL field directly from television 122 when the user is already watching television 122. Downloading from a server device is frequently time-consuming, and service providers sometimes experience failures. Furthermore, it may be possible to supplant Internet access across packet-switched networks in favor of radio-frequency communication systems (e.g. cellular mobile transmission).

The third embodiment for obtaining menu items for building a URL involves obtaining a history of user inputs. In one embodiment, previously-accessed URLs which have not been saved as menu selection items 128, 130, 132 in set top box 114 are stored with client-specific information in storage 230 by server 110. A client accessing their related information thus displays items on the screen of television 122, and uses arrow keys 136 to 142 and select button 144 on remote control 124 to select and store these terms as menu selection items 128, 130, 132 in non-volatile memory 218. Optionally, instead of storing these previously-accessed URLs into storage 230 of server 110, this history of URLs is stored in a separate file of nonvolatile storage memory 218 of set top box 114.

Figure 6:
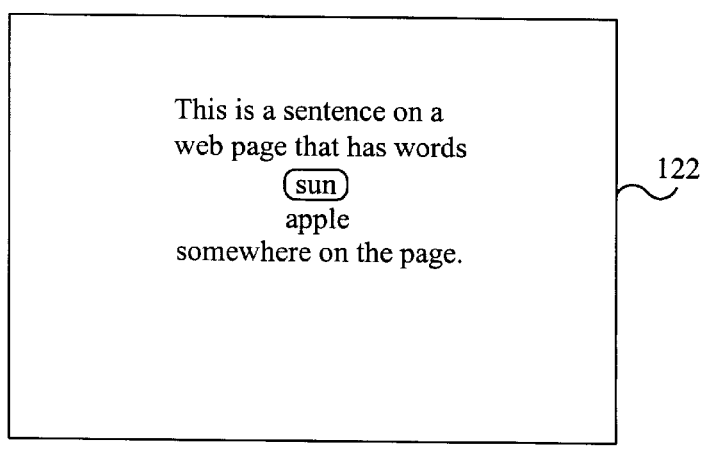
FIG. 6 illustrates capture of text data from a web page for building a URL.

FIG. 6 illustrates a fourth embodiment for obtaining menu items for building a URL from other text fields. In the embodiment of FIG. 6, television 122 has a screen alternately containing a web page 318, a page from a word processing document, or from a television broadcast. The screen contains text information in the form of words and/or sentences. A sentence such as "This is a sentence in a web page that has words /sun/apple/ somewhere on the page . . . " is illustrated in FIG. 6. CPU 208 in set top box 114 scans information displayed on the screen to parse and identify text strings. The user then preferably presses arrow keys 136 to 142 to move a cursor to the position of a current string. A current string position is optionally indicated by highlighting or reverse video of the current text cursor position. When the user identifies a word or term, e.g. "sun," that is desired for inclusion in non-volatile storage 218 of set top box 114, select button 144 is pressed and this word or term is preferably stored in database 130 for a middle field of a URL.

Building a URL using the foregoing current document method further increases the sources of information applicable to Internet access. Instead of being required to click on a series of web links to return to a given site, the URL of the site is stored at the time it appears on a displayed page. The current document method of FIG. 6 thus stores only the desired field of the URL, instead of the entire web page address.

The present invention, therefore, provides a plurality of methods for building URL menus in a set top box for an Internet television. One distinguishing feature of the invention is that a URL is parsed into a number of fields, and each of these fields is stored independently so that combinations of these fields may be independently selected to obtain an entire URL. This contrasts with the prior art, where an entire URL is stored in toto.

The present invention has been described herein with respect to a number of embodiments. However, those having ordinary skill in the art will recognize various modifications to the scope of these embodiments that are consistent with the invention. Thus, the scope of the invention is intended to encompass the particular embodiment disclosed herein as well as modifications thereto. Accordingly, the scope of the invention is limited only by the following claims.

What is claimed is:

1. A method of building an address menu, comprising the steps of:
   dividing addresses into fields, said fields including a preamble field, a middle field, and a postamble field;
   storing sets of said fields into a memory; and
   selecting from said sets of said fields to build said address menu.

2. The method of claim 1, further comprising the step of:
   obtaining information for said fields from a vertical blanking interval in a video signal.

3. The method of claim 1, further comprising the step of:
   obtaining information for said fields from a user input history of previous selections.

4. The method of claim 1, further comprising the step of:
   obtaining information for said fields from text information in a current document page.

5. The method of claim 1 wherein said addresses are Uniform Resource Locators (URLs).

6. The method of claim 1 wherein said address menu is used with an Internet television system.

7. The method of claim 1 wherein said memory resides with a client in a client/server architecture.

8. The method of claim 1 wherein said addresses are divided into first, second, and third fields.

9. The method of claim 1 wherein:
   said address menus are used for an Internet television system, said addresses are Uniform Resource Locators (URLs) divided into first, second, and third fields, and said memory resides with a client in a client/server architecture.

10. The method of claim 1, further comprising the step of:
    selecting from said address menu to obtain a search URL.

11. The method of claim 1, further comprising the step of:
    accessing a web page with a search address from said menu.

12. An apparatus for building an address menu, comprising:
    means for dividing said addresses into fields, said field including a preamble field, a middle field, and a postamble field;
    means for storing sets of said fields into a memory; and
    means for selecting from said sets of said fields to build said address menu.

13. The apparatus of claim 12, further comprising:
    means for obtaining information for said fields from a vertical blanking interval in a video signal.

14. The apparatus of claim 12, further comprising:
    means for obtaining information for said fields from a user input history of previous selections.

15. The apparatus of claim 12, further comprising:
    means for obtaining information for said fields from text information in a current document page.

16. The apparatus of claim 12 wherein said addresses are Uniform Resource Locators (URLs).

17. The apparatus of claim 12 wherein said address menu is used with an Internet television system.

18. The apparatus of claim 12 wherein said memory resides with a client in a client/server architecture.

19. The apparatus of claim 12 wherein said addresses are divided into first, second, and third fields.

20. The apparatus of claim 12 wherein:

said address menu is used for an Internet television system, said addresses are Uniform Resource Locators (URLs) divided into first, second, and third fields, and said memory resides with a client in a client/server architecture.

21. The apparatus of claim 12, further comprising:

means for selecting items from said menu to obtain a search URL.

22. The apparatus of claim 21, further comprising:

means for accessing a web page with said search URL.

23. An apparatus for building a menu of addresses, comprising:

a server for storing fields, said fields including a preamble field, a middle field, and a postamble field; and a set top box for accessing said fields from addresses;

whereby a user accesses said fields from said server and selects desired menu items for storing in said set top box.

24. The apparatus of claim 23, wherein:

said fields form Uniform Resource Locators (URLs) which are divided into three discrete fields, including said preamble field, said middle field, and said postamble field.

25. The apparatus of claim 24, further comprising:

a remote control including a URL button, arrow keys and a select button for selecting said fields of said URLs.

26. The apparatus of claim 24, wherein:

said set top box captures broadcast information from a vertical blanking interval with a tuner and selects said information with a remote control; and said fields of said URLs from said broadcast information are stored in a memory of said set top box.

27. The apparatus of claim 23, wherein:

said set top box captures a history of user inputs for said fields.

28. The apparatus of claim 23, wherein:

said set top box captures one or more of said fields from a current page.

29. A computer-readable medium comprising program instructions for building a menu of Universal Resource Locators (URLs) comprising;

means for dividing URLs into fields;

means for storing each of said fields separately in a first memory;

means for moving a set of said fields from said first memory to a second memory; and means for selecting said set of said fields to form a search URL.

30. The apparatus of claim 23, wherein said menu items form a search Universal Resource Locator (URL).

31. The apparatus of claim 23, wherein said menu items access a web page.

32. The apparatus of claim 23, wherein said menu items are used for an Internet television system.

33. A method of building an address menu, comprising the steps of:

dividing addresses into fields;

storing said fields to a first memory;

selecting from said fields to obtain menu items which are stored into a second memory;

selecting from said menu items to obtain a search URL; and accessing a web page with said search URL.

34. The method of claim 33, wherein:

said fields are three in number, and include a preamble, a postamble, and a middle field.

35. The method of claim 33, further comprising the step of:

moving each of said fields separately from a server to a client.

36. The method of claim 33, further comprising the step of:

displaying said fields of said search URL.

37. The method of claim 33, further comprising the steps of:

varying one or more of said fields to create a different combination of said fields and another search URL;

accessing another web page with said another search URL.

38. The method of claim 33, further comprising the step of:

capturing one or more of said fields from a broadcast signal.

39. The method of claim 38, wherein:

said broadcast signal is information in a vertical blanking interval.

40. The method of claim 33, further comprising the step of:

capturing one or more of said fields from a current page.

41. The method of claim 33, further comprising the step of:

capturing one or more of said fields from a user input history.

42. A computer-readable medium comprising program instructions for building an address menu by performing the steps of:

dividing addresses into fields, said fields including a preamble field, a middle field, and a postamble field;

storing sets of said fields into a first memory; and selecting from said sets to build said address menu.

43. A computer-readable medium comprising program instructions for building a menu of Universal Resource Locators (URLs) by performing the steps of:

dividing URLs into fields;

storing each of said fields separately in a first memory;

moving a set of said fields from a first memory to a second memory; and selecting from said set of said fields to form a search URL.

* * * * *